US009306708B2

(12) United States Patent
Lu et al.

(10) Patent No.: US 9,306,708 B2
(45) Date of Patent: Apr. 5, 2016

(54) METHOD AND APPARATUS FOR RETRANSMISSION DECISION MAKING

(71) Applicant: THOMSON LICENSING, Issy de Moulineaux (FR)

(72) Inventors: Xiuping Lu, Hillsborough, NJ (US); Ishan Uday Mandrekar, Monmouth Junction, NJ (US); Ramkumar Perumanam, Carmel, IN (US); Hang Liu, North Potomac, MD (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/670,688

(22) Filed: Mar. 27, 2015

(65) Prior Publication Data

US 2015/0200750 A1 Jul. 16, 2015

Related U.S. Application Data

(62) Division of application No. 13/575,646, filed as application No. PCT/US2010/000228 on Jan. 28, 2010.

(51) Int. Cl.
*H04L 12/00* (2006.01)
*H04L 1/14* (2006.01)
(Continued)

(52) U.S. Cl.
CPC ............ *H04L 1/1838* (2013.01); *H04L 1/1671* (2013.01); *H04L 1/1877* (2013.01)

(58) Field of Classification Search
CPC ....... H04L 1/18; H04L 1/1816; H04L 1/1819; H04L 1/1838; H04L 1/1854; H04L 47/10; H04W 28/0273
USPC .................... 370/235, 236, 253; 714/749, 750
See application file for complete search history.

(56) References Cited

U.S. PATENT DOCUMENTS

| 5,764,307 A | 6/1998 | Ozcelik et al. |
| 5,822,524 A | 10/1998 | Chen et al. |

(Continued)

FOREIGN PATENT DOCUMENTS

| CN | 1669263 | 9/2005 |
| CN | 1848721 | 10/2006 |

(Continued)

OTHER PUBLICATIONS

Pahalawatta et al., "Content Aware Resource Allocation for Scalable Video Transmission to Multiple Users Over a Wireless Network", Evanston, Illinois, 2007 IEEE, pp. 853-856.
(Continued)

*Primary Examiner* — Dang Ton
*Assistant Examiner* — Ryan Kavleski
(74) *Attorney, Agent, or Firm* — Robert D. Shedd; Reitseng Lin

(57) ABSTRACT

A method comprising: receiving a scalable video coding (SVC) encoded video data from a source of digital video data, the SVC-encoded video data carrying a video content, the SVC-encoded video data including a network abstraction layer (NAL) extension header, a first layer for the video content, and a second layer for the video content, the first layer including first video data utilized to retrieve the video content in basic quality from the SVC-encoded video data, the second layer including second video data utilized along with the first video data to retrieve the video content in enhanced quality from the SVC-encoded video data; parsing the NAL extension header to identify the first and second video data; assigning a higher priority to the first video data for retransmission relative to the second video data; caching the first and second video data with the assigned priority in a buffer memory; monitoring a digital data network to collect first network transport conditions, the digital data network being connected in signal communication with a receiver, the digital data network involving first and second data transport protocols, the first protocol being less reliable than the second protocol; receiving a retransmission request transmitted on the second protocol from the receiver, the retransmission request including data indicating second network transport conditions of the digital data network determined at the receiver, the second network transport conditions including at least one of an end-to-end packet loss rate, an available bandwidth of the digital data network, and a round-trip delay; and determining whether to recover at least one of the first and second video data from the buffer memory and transmit the recovered video data to the receiver on the second protocol via the digital data network in accordance with the assigned priority in view of the first and second network transport conditions in response to the retransmission request.

6 Claims, 10 Drawing Sheets

(51) Int. Cl.
*H04L 1/18* (2006.01)
*H04L 1/16* (2006.01)

(56) References Cited

U.S. PATENT DOCUMENTS

| | | | |
|---|---|---|---|
| 5,918,002 | A | 6/1999 | Klemets et al. |
| 7,319,698 | B2 | 1/2008 | Higashigawa et al. |
| 8,185,792 | B2 | 5/2012 | Suneya |
| 8,391,356 | B1 * | 3/2013 | Jafari et al. ............ 375/240.01 |
| 8,462,856 | B2 * | 6/2013 | Eleftheriadis .. H04N 21/234327 375/240.29 |
| 9,077,964 | B2 * | 7/2015 | Cipolli ................. H04L 1/1607 |
| 2001/0047423 | A1 | 11/2001 | Shao et al. |
| 2002/0154600 | A1 | 10/2002 | Ido et al. |
| 2003/0067877 | A1 * | 4/2003 | Sivakumar et al. ........... 370/232 |
| 2003/0126238 | A1 | 7/2003 | Kohno et al. |
| 2003/0206549 | A1 | 11/2003 | Mody et al. |
| 2004/0037224 | A1 | 2/2004 | Choi et al. |
| 2004/0240415 | A1 | 12/2004 | Lane |
| 2005/0021821 | A1 | 1/2005 | Turnbull et al. |
| 2005/0111371 | A1 | 5/2005 | Miura |
| 2006/0104279 | A1 | 5/2006 | Fellman et al. |
| 2006/0200722 | A1 | 9/2006 | Braun |
| 2007/0116277 | A1 * | 5/2007 | Ro et al. ....................... 380/201 |
| 2007/0153806 | A1 | 7/2007 | Celinski et al. |
| 2007/0206497 | A1 | 9/2007 | Plamondon et al. |
| 2008/0043619 | A1 | 2/2008 | Sammour et al. |
| 2008/0151881 | A1 | 6/2008 | Liu et al. |
| 2008/0198787 | A1 | 8/2008 | Nguyen |
| 2008/0219204 | A1 | 9/2008 | Lee et al. |
| 2009/0168731 | A1 | 7/2009 | Zhang et al. |
| 2009/0169731 | A1 | 7/2009 | Albrecht et al. |
| 2009/0175353 | A1 | 7/2009 | Suh et al. |
| 2009/0178087 | A1 | 7/2009 | Menn |
| 2009/0222855 | A1 | 9/2009 | Vare et al. |
| 2010/0217887 | A1 | 8/2010 | Bouazizi et al. |
| 2010/0260259 | A1 | 10/2010 | Kimmich et al. |
| 2011/0134748 | A1 * | 6/2011 | Spatscheck et al. .......... 370/216 |
| 2011/0194481 | A1 | 8/2011 | Chow et al. |
| 2012/0170445 | A1 | 7/2012 | Perumanam et al. |
| 2013/0003579 | A1 | 1/2013 | Lu et al. |

FOREIGN PATENT DOCUMENTS

| | | |
|---|---|---|
| CN | 101018109 | 8/2007 |
| CN | 101262321 | 9/2008 |
| CN | 101262604 | 9/2008 |
| CN | 101543018 | 9/2009 |
| EP | 0853407 | 7/1998 |
| EP | 1379051 | 1/2004 |
| EP | 1855410 | 11/2007 |
| EP | 1855411 | 11/2007 |
| EP | 1863212 | 12/2007 |
| EP | 1965535 | 9/2008 |
| JP | 7221789 | 8/1995 |
| JP | 9191314 | 7/1997 |
| JP | 2000036837 | 2/2000 |
| JP | 3193947 | 5/2001 |
| JP | 2001268134 | 9/2001 |
| JP | 200284338 | 3/2002 |
| JP | 2002084239 | 3/2002 |
| JP | 2002141964 | 5/2002 |
| JP | 2003179580 | 6/2003 |
| JP | 2004056393 | 2/2004 |
| JP | 2005512400 | 4/2005 |
| JP | 200613911 | 1/2006 |
| JP | 2006203649 | 8/2006 |
| JP | 2008312126 | 12/2008 |
| JP | 2009521881 | 6/2009 |
| KR | 20040086242 | 10/2004 |
| KR | 2005049318 | 5/2005 |
| KR | 2005118834 | 12/2005 |
| KR | 2007091970 | 9/2007 |
| KR | 20080051275 | 6/2008 |
| KR | 20090027181 | 3/2009 |
| WO | WO0124385 | 4/2001 |
| WO | WO0184732 | 11/2001 |
| WO | WO03049373 | 6/2003 |
| WO | WO03104935 | 12/2003 |
| WO | WO2004010250 | 1/2004 |
| WO | WO2004030266 | 4/2004 |
| WO | WO2004053732 | 6/2004 |
| WO | WO2006064454 | 6/2006 |
| WO | WO2007046957 | 4/2007 |
| WO | WO2008074771 | 6/2008 |
| WO | WO2008112779 | 9/2008 |
| WO | WO2010002420 | 1/2010 |

OTHER PUBLICATIONS

Grinnemo et al., Taxonomy and Survey of Retransmission-Based Partially Reliable Transport Protocols, Computer Communications 27, 2004, pp. 1441-1452.
Podolsky et al., "A RTCP-Based Retransmission Protocol for Unicast RTP Streaming Multimedia", Internet Engineering Task Force, Oct. 22, 1999.
Li et al., "Integrating Retransmission Diversity with Real-Time Scheduling over Wireless Links", 2009 IEEE.
Jung et al., "Channel-Adaptive Packet Scheduler for Retransmission-Based Peer-to-Peer Stored-Video Streaming", Tenth IEEE International Symposium on Multimedia, IEEE Computer Society, 2008 IEEE.
International Search Report for International Application No. PCT/US2010/000228 dated Nov. 4, 2010.
CN Search Report Corresponding CN Application No. 2009801618600 dated May 4, 2014.
CN Search Report Corresponding CN Application No. 2009801618600 dated May 4, 2014 in English.
Non-Final Office action for Related U.S. Appl. No. 13/575,653 dated Nov. 14, 2014.
International Search Report for Related International Application No. PCT/US2010/000223 dated Aug. 4, 2010.
International Search Report for Related International Application No. PCT/US2009/005499 dated Sep. 28, 2010.
Non-Final Office Action for Related U.S. Appl. No. 13/395,796 dated Sep. 25, 2013.
Final Office Action for Related U.S. Appl. No. 13/395,796 dated Feb. 13, 2014.
Non-Final Office Action for Related U.S. Appl. No. 13/395,796 dated Nov. 6, 2014.
Internet document: RealNetworks, Chapter 8: Multicasting; https://service.real.com/help/library/guides/helixuniversalproxy/htmfiles/multicst.htm, Year 2002.
US Office Action for related U.S. Appl. No. 13/395,796 dated Dec. 17, 2015.

* cited by examiner

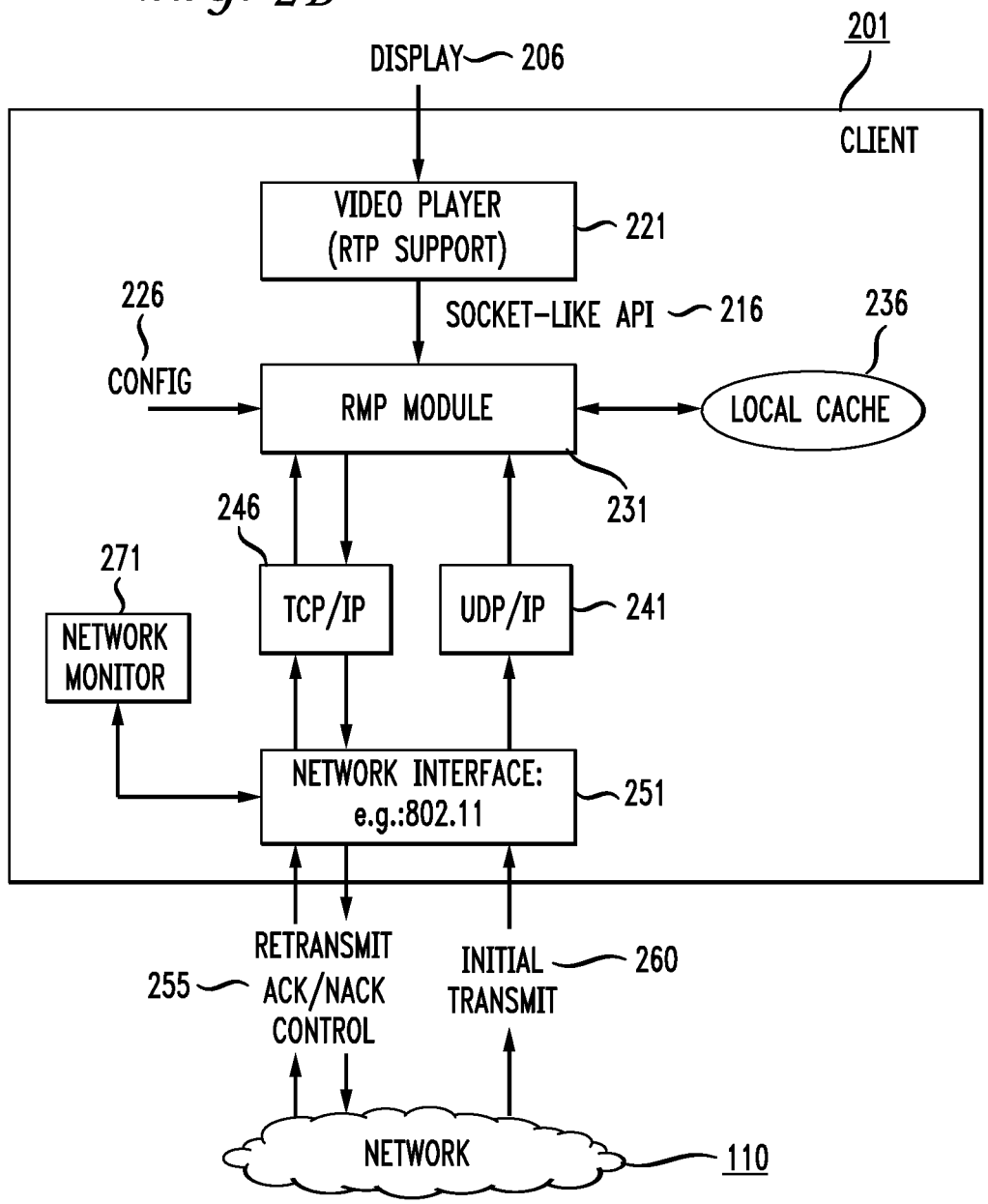

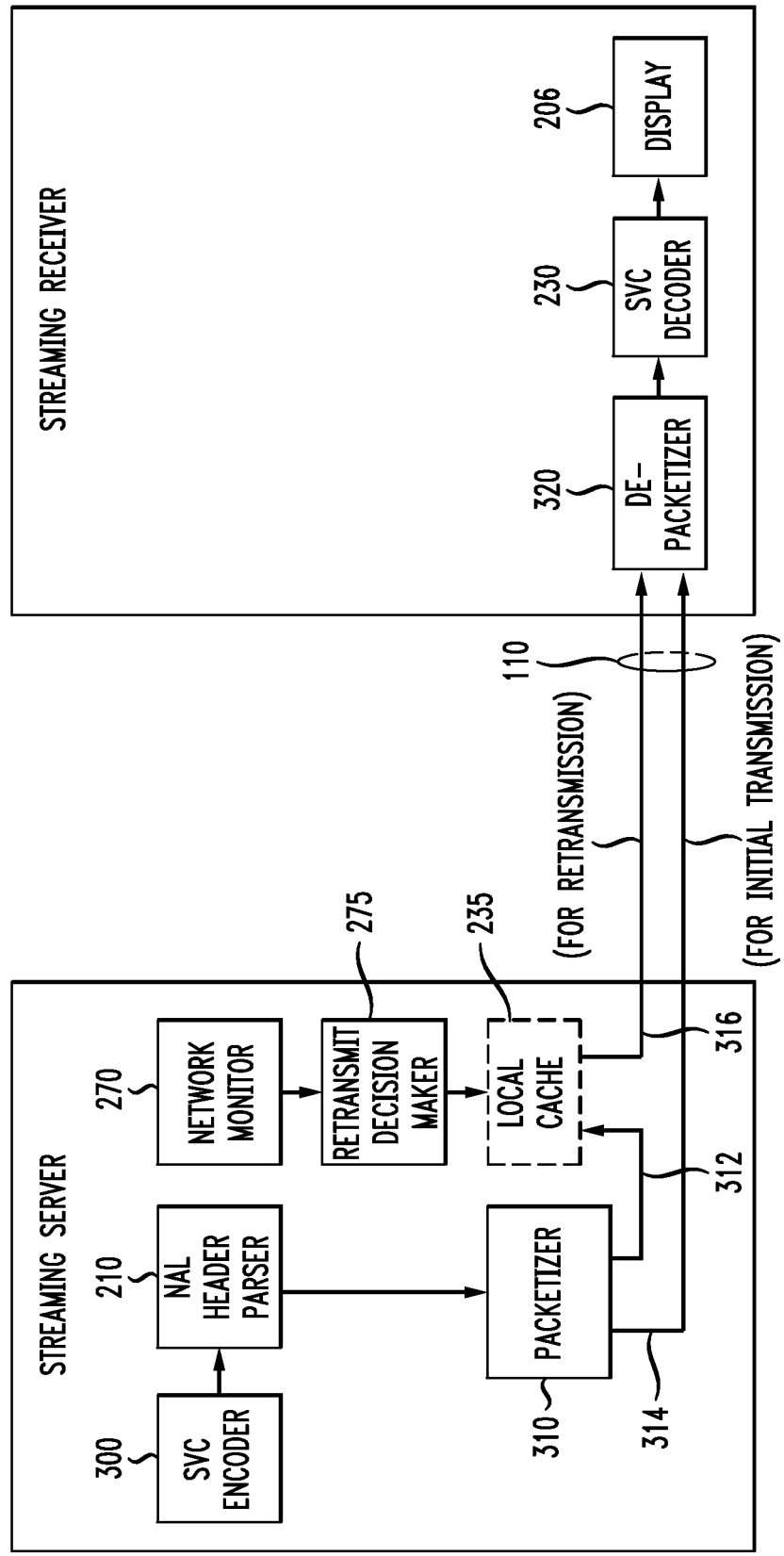

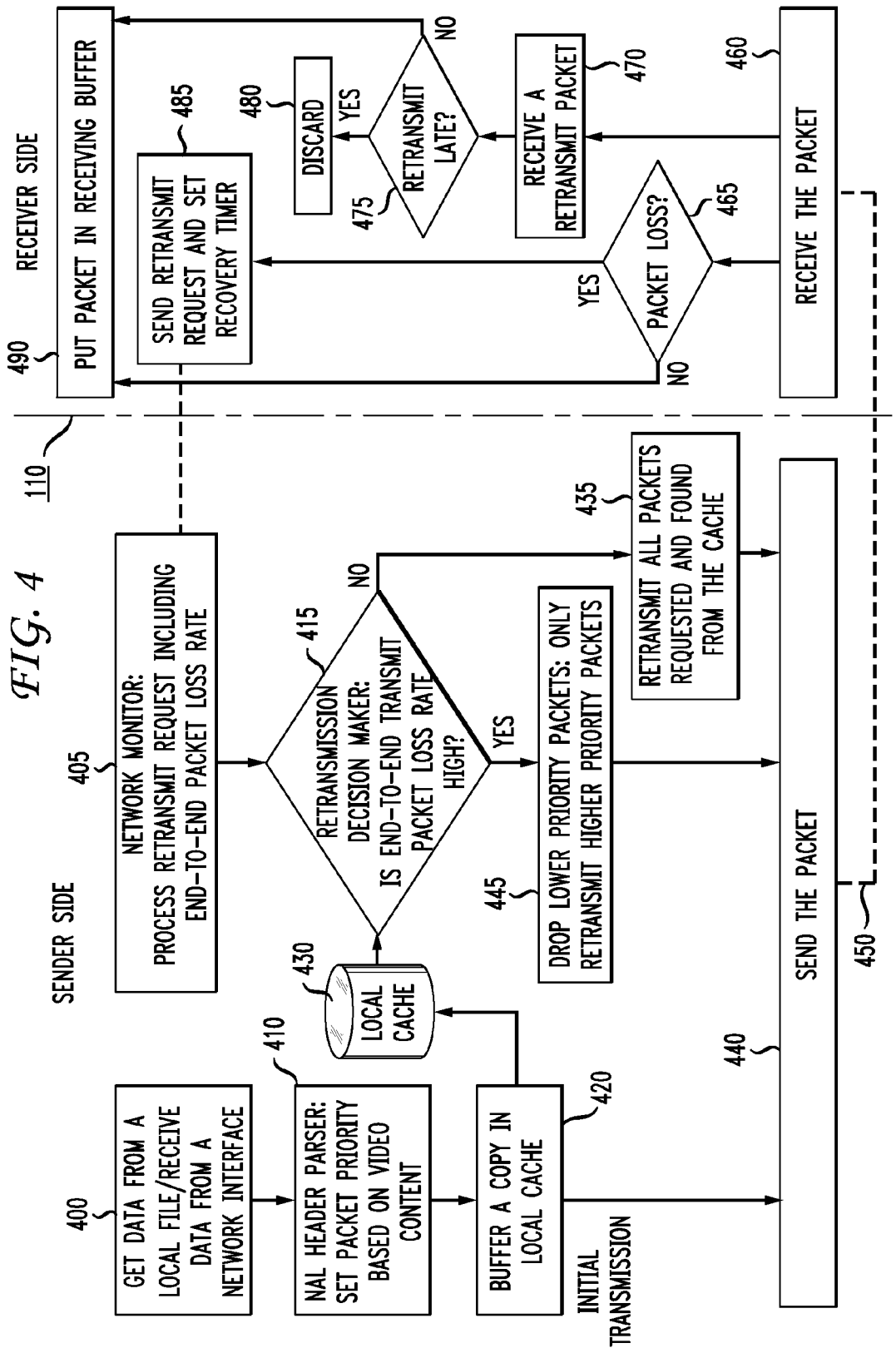

An example Message format of Piggyback End-to-end Packet Loss Rate with Retransmission Request

FIG. 9

| 00000001 | 0000000ACK | Header length |
|---|---|---|
| Base sequence # of starting packet ||| 
| Offset for ending packet |||

ARQ Request (NACK) Packet (Format 1)

FIG. 10

| 00000001 | 0000000ACK | Header length |
|---|---|---|
| Base sequence # |||
| bitmap |||

RMP ARQ Request (NACK) Packet (Format 2)

METHOD AND APPARATUS FOR RETRANSMISSION DECISION MAKING

CROSS-REFERENCE TO RELATED APPLICATION(s)

This application is a division of application Ser. No. 13/575,646, which is the national stage of International Application No. PCT/US2010/000228 filed 28 Jan. 2010. Thus, this divisional application claims the benefit, under 35 U.S.C. §365, of International Application PCT/US2010/000228 filed 28 Jan. 2010, which was published in accordance with PCT Article 21(2) on 4 Aug. 2011, in English.

This application is related to the following co-pending, commonly owned, U.S. Patent Applications: (1) Ser. No. 13/395,796 entitled EFFICIENT APPLICATION-LAYER AUTOMATIC REPEAT REQUEST RETRANSMISSION METHOD FOR RELIABLE REAL-TIME DATA STREAMING IN NETWORKS filed on Oct. 7, 2009 as an international patent application (Filing No. PCT/US09/005499) and (2) Ser. No. 13/575,653 entitled METHOD AND APPARATUS FOR PARSING A NETWORK ABSTRACTON-LAYER FOR RELIABLE DATA COMMUNICATION filed on Jan. 28, 2010 as an international patent application (Filing No. PCT/US10/00223, Thomson Docket No. PU090157).

The present application relates to digital data networks in general and in particular, to a network monitor and data retransmission decision maker for reliable digital data transmission.

In multicast or broadcast applications, data are typically transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

Data is usually formatted into packets and/or frames for transmission. That is, packets and/or frames are data formatting schemes. As used herein data can be formatted into any convenient format for transmission including packets and/or frames. "Packet" will, thus, be used herein to define any data formatting scheme known to one of ordinary skill in the art.

Video transmission or distribution in wireless networks is used by way of example herein of one application of a digital data network. Video transmission in a wireless data network normally involves packet loss caused by channel error conditions such as interference, channel fading, collision, etc. When such channel error conditions occur, the wireless link layer of the protocol stack may try to retransmit packets for a fixed number of times within a fixed time period. If these retransmissions are not successful, the packets are dropped by the wireless link layer. Internet Protocol (IP) network based video transmission typically delivers video packets to the destination (receiver; sometimes referred to as a client herein) using Real-time Transport Protocol (RTP) protocol that, in turn, uses either a reliable Transmission Control Protocol (TCP) transport protocol or a less reliable User Datagram Protocol (UDP) transport protocol. When the less reliable UDP protocol is used, for example, the protocol does not provide a means to detect out-of-order packets or recover lost packets and leaves the responsibility to an application to recover packet delivery errors. In contrast, when TCP protocol is used, end-to-end acknowledgements are provided so that the protocol tries to send and/or recover media (audio, video, multimedia, . . . ) packets (data) strictly in the order in which the packets are to be handled by the application. When packet errors are detected, TCP provides a sliding window mechanism for data flow control and reduces the packet transmission rate. TCP keeps retransmitting the lost packets until they are recovered.

Video transmission is an example of an application which occurs in real time and has a user viewing experience associated with the receipt and rendering of the data. A latency or time constraint within which the packets have to be delivered or recovered should not impact the end user's viewing experience. Therefore, packet errors ought to be recovered within a limited time, otherwise the data may not be viewable. TCP does not presently provide for control of packet recovery based on a time constraint. Consequently, using TCP as the transport protocol for wireless networks, could lead to a poor user viewing experience. Furthermore, TCP requires positive acknowledgement for all the transmitted data packets. The TCP uplink acknowledgements (from data receiver to data transmitter (sender)) compete for the wireless bandwidth with downlink data traffic (from transmitter (sender) to receiver). If collisions occur among downlink and uplink transmissions, the collisions could lead to further throughput reduction.

PCT Application US/09/005,499, filed Oct. 7, 2009, discloses an efficient application-layer automatic repeat request retransmission method where data to be transmitted is buffered or cached at a module for implementing a reliable media protocol to recover lost data packets and aid, for example, in real-time streaming (such as video) data applications. Referring briefly to FIG. 1 (derived from FIG. 5 of PCT Application US/09/005,499 mentioned above), a real-time protocol packetization module 120 is provided at a real-time server 100, for example, for receiving a video digital data input 105. Real-time protocol (RTP) packetization module 120 providing a streaming application is connected via, for example, a socket-like application programming interface (API) or interfaces 115 to the reliable media protocol module 130. The reliable media protocol module 130 accepts configuration data parameters 125 such as cache or buffer size, maximum time to wait for packet recovery and the like. These parameters are determined, for example, by the digital application, for example, telephony, audio, video or multimedia among other known applications. The local buffer or cache memory 135 temporarily stores initially transmitted packets until it may be determined whether they need be retransmitted or discarded. Server 100 transmits digital data by way of one of UDP/IP transmitter interface 140 or TCP/IP transmitter/receiver interface 145 and a digital data network interface, for example, an Ethernet/802.11 interface 150. Initial real-time transmission may occur via initial transmit 160 to network 110 with real-time packets temporarily stored in cache/buffer 135, for example, awaiting receipt of Retransmit ACK/NACK control 155 or a predetermined time-out.

It would be advantageous to have an efficient method and apparatus to add further reliability to such a reliable media protocol based real-time data transmission system such as the one disclosed in the foregoing PCT Application US/09/005,499. The present invention addresses these and/or other issues.

In accordance with an aspect of the present invention, a method is disclosed. According to an exemplary embodiment, the method comprises monitoring a digital data network to collect network transport statistics, and deciding whether to retransmit a digital data packet to a receiver based on the collected network transport statistics.

In accordance with another aspect of the present invention, an apparatus is disclosed. According to an exemplary embodiment, an apparatus, such as a digital data transmitter, comprises a digital data network monitor for collecting network transport statistics, and a retransmission decision maker for deciding whether to retransmit a digital data packet based on an assigned digital data packet priority and the collected network transport statistics.

In accordance with another aspect of the present invention, an apparatus is disclosed. According to an exemplary embodiment, an apparatus, such as a digital data transmitter, comprises means, such as a network monitor, for collecting network transport statistics, and means, such as a retransmit decision maker, for deciding whether to retransmit a digital data packet based on an assigned digital data packet priority and collected network transport statistics.

In accordance with another aspect of the present invention, an apparatus is disclosed. According to an exemplary embodiment, an apparatus, such as a digital data receiver, comprises a network monitor for collecting network statistics from the perspective of a receiver apparatus, and a network interface for outputting a control channel message including said collected network statistics.

In accordance with another aspect of the present invention, an apparatus is disclosed. According to an exemplary embodiment, an apparatus, such as a digital data receiver, comprises means, such as a network monitor, for collecting network statistics from the perspective of a receiver apparatus, and means, such as a network interface, for outputting a control channel message including said collected network statistics The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a schematic block diagram of a server having a reliable media protocol module and local cache or buffer for storing, for example, real-time packets awaiting a retransmission decision derived from FIG. 5 of related PCT Application US/09/005,499 mentioned above.

FIG. 2A is a schematic block diagram of a server in accordance with the principles of the present invention showing a network abstraction-layer (NAL) header parser, a network monitor and a retransmit decision maker according to the present invention for monitoring a network interface for current network statistical data and providing an input to a reliable media protocol (RMP) module; FIG. 2B is a schematic block diagram of an associated client having a network monitor for collecting receiver network-specific statistical data for transmission to the server of FIG. 2A in accordance with the principles of the present invention.

FIG. 3A is a simplified block schematic drawing of a streaming server in accordance with the principles of the present invention having a NAL header parser for receiving an input from a scalable video coding (SVC) encoder, a network monitor and a retransmit decision maker. FIG. 3A further depicts a streaming receiver for receiving digital data from the streaming server. FIG. 3B is a block schematic drawing of the streaming server of FIG. 3A showing the NAL header parser receiving an input from a local MP4 file reader. FIG. 3C shows the NAL header parser of FIG. 3A receiving an input from the network via a de-packetizer.

FIG. 4 shows a flowchart of operations at a sender side for abstraction-layer header parsing and network monitoring in accordance with the principles of the present invention, where the sender may be a transmitter, server or streaming server of FIG. 2A or FIG. 3. FIG. 4 further shows a data receiver and associated network monitoring operations where the receiver may be the client of FIG. 2B or the streaming receiver of FIG. 3.

FIG. 9 shows a first exemplary format of an ARQ request (NACK) packet from which network monitoring statistics may be derived according to aspects of the present invention.

FIG. 10 shows a second exemplary format of an RMP ARQ Request (NACK) packet in which network monitoring statistics may be transmitted and derived according to aspects of the present invention.

Figure 2A:
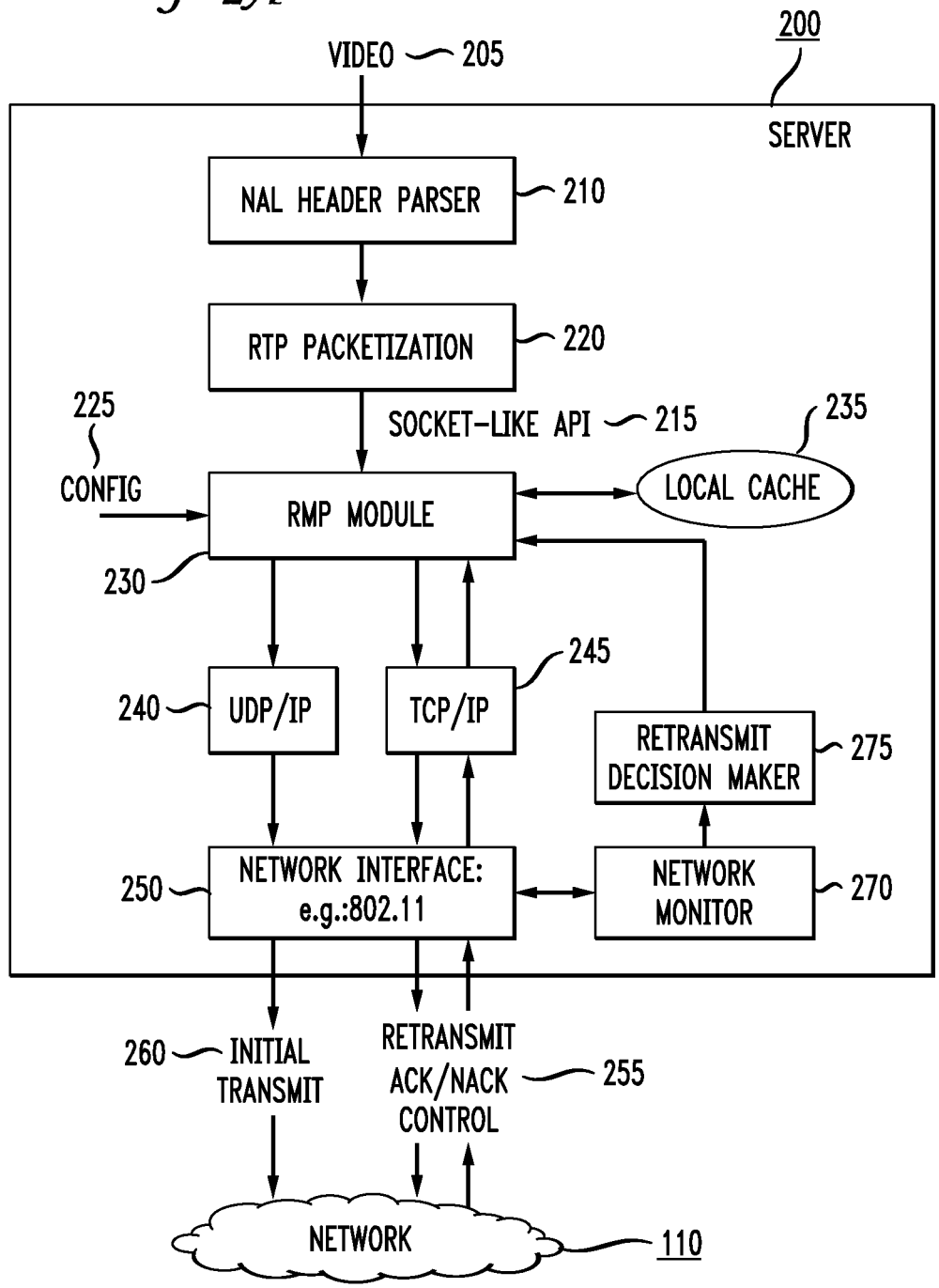

The present invention is directed to a method and apparatus at a transmitter or sender for parsing an abstraction-layer header as an input to the real-time (for example, real-time protocol or RTP) packetization for a module for an improved reliable media protocol module per FIGS. 2A and 2B and to a network monitor and retransmission decision maker of the transmitter/server 200 (FIG. 2A) which may utilize the parser priority output to selectively retransmit data based on monitored network conditions, for example, packet loss rate. According to one embodiment, a network abstraction-layer, for example, an H.264/AVC Network Abstraction Layer (NAL) of a real-time video encoder such as an MPEG-4 scalable video encoder (SVC) comprises a header that provides fields that may be parsed to determine digital data priority. For example, the NAL is network-friendly and may represent either video telephony, for example, video conversational applications and non-conversational applications such as storage of a down-loaded movie in memory, a broadcast or multicast application or streaming application or other non-conversational application. The NAL, for example, may be defined to represent a plurality of abstraction-layer units in the form of packets having one or more bytes. The first byte of each NAL unit may be a header byte indicating the type of data of the unit while remaining bytes contain payload data of a type indicated by the NAL header.

According to one embodiment, an abstraction-layer header parser comprises parsing a scalable video encoder abstraction-layer header to obtain data from one of a plurality of fields. According to aspects of this embodiment, the abstraction-layer header parser may operate, for example, on output digital video data of an MPEG 4 file reader or accept digital data from a network as received at a de-packetizer. For example, the abstraction-layer header parser may parse a DID field which represents an inter-layer coding dependency level of layer representation. A QID field represents a quality level of medium grain scalability (MGS) layer representation. A TID field represents a temporal level of layer representation. One result of parsing an abstraction-layer header, comprising such fields, is to identify the layer that the following payload data is associated with. One result of parsing an abstraction-layer header, comprising such fields, is to identify the layer that the following payload data is associated with. Responsive to the identification of the payload data type, one may assign a different priority for each identified layer. For example, a base layer may receive a high priority for retransmission from buffer or cache memory since base layer is absolutely necessary for a complete decoding at a receiver. Responsive to the identification of the payload data type, the parser may assign a different priority for each identified layer for the following data. For example, a base layer may receive a high priority for retransmission from buffer or cache memory since base layer data is absolutely necessary for a complete decoding at a receiver. An enhancement layer may be assigned a medium priority since enhancement layer data is necessary for decoding of a higher layer. On the other hand, a high enhancement layer of payload data may be assigned a low priority. Once assigned a priority, for example, low, medium and high, the priority information may be represented in a "payload type" (PT) or similar field of a real-time protocol (RTP) header, if retransmission is called for at the transport layer, or in a type of service (TOS) field of an IP header. A type of service field may be also known in the art, by way of example, as a differential services (DS) field. The first two bits are known as explicit congestion notification (ECN) bits, and the next six bits of a DS field byte are known as differential services code point (DSCP) bits. Type of service will be generally used herein to refer to these and other formats for providing type of service data. A real-time packet retransmission decision made by a reliable media protocol module may be thus layer-aware when modified to incorporate an abstraction-layer header parser and method according to one embodiment.

In a further embodiment, a network monitor is provided for monitoring data network quality via a data network interface and, for example, collecting current network data statistics for input to a retransmit decision maker, for example, packet loss rate, available bandwidth, and round-trip delay. The retransmit decision maker, in turn, may provide an input to the reliable media protocol (RMP) module so that a decision on retransmission may be based on current network conditions according to the data network statistical data collected at the network monitor and selectively decide to retransmit a packet based on its priority and the monitored network conditions.

Accordingly, a digital transmission method comprises parsing an abstraction-layer header of a digital data packet to obtain layer representation data, and assigning a priority to the digital data packet for the representation layer responsive to the parsing. Obtaining layer representation data may comprise one or all of determining inter-layer coding dependency level, determining a quality level of grain scalability and determining temporal level of the layer representation. Moreover, the method may further comprise one of representing the priority level in a payload type field of a real-time transport packet header or in a type of service field of an internet protocol packet header. As described above, an input to the abstraction-layer header parser may be received from a de-packetizer for receiving network data or received from a local server memory such as one associated with an MPEG file reader.

Moreover, in a further embodiment, a digital data transmitter may comprise an abstraction-layer header parser to obtain layer representation data from a digital data packet and assign a priority to the layer representation data, a digital data monitor for collecting network transport statistics, and a retransmission decision maker for deciding whether to retransmit a digital data packet based on the assigned digital data packet priority and the collected network transport statistics. As explained above, such an abstraction-layer header parser in a further embodiment may be a network abstraction-layer header parser for digital video data packet applications.

More specifically, referring to FIGS. 2-10, an abstraction-layer header parser, a data monitor and a retransmit decision maker of a server and a network monitor of a receiver provide for a highly reliable operation of RMP module 235 in making a decision whether or not to retransmit a packet that has been reported lost over a transmit control channel 255 as will be further described herein. Video transmission or distribution in wireless networks typically use real-time transport protocol (RTP), motion picture expert group 2 transport stream (MPEG2TS) over UDP. Real-time video could be distributed from a single source to a single destination (unicast mode) or from a single source to multiple destinations (multicast mode). Since channel conditions vary in wireless networks, packet transmissions, when the channel conditions are not good, result in dropped packets if the link layer error recovery is not successful. In these situations, there is a gap in the packet sequence resulting in poor viewing quality for the end user. The present invention provides an abstraction-layer header parsing functionality for an efficient application-layer based retransmission scheme, called reliable media protocol (RMP) herein, to recover packet losses to aid in reliable real-time streaming applications. The present invention also provides network monitoring capabilities at a transmitter and at a receiver side to improve packet retransmission decision making at server/transmitter 200 of FIG. 2A. Consequently, a network monitor 271 is provided at a receiver/client 201 of FIG. 2B.

Figure 1:
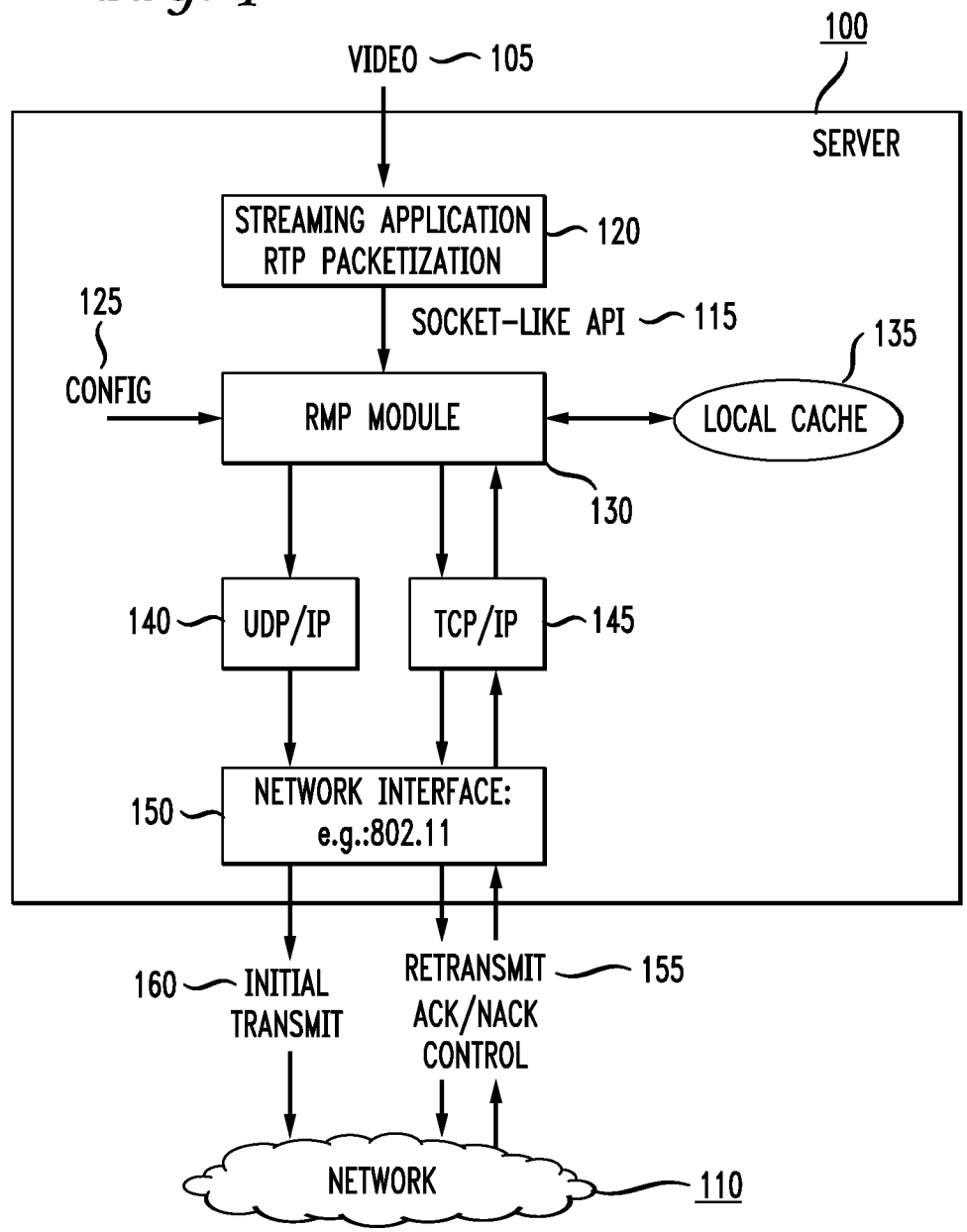

Referring to FIGS. 2A and 2B, in the reliable media protocol (RMP) method of the present invention, RTP packetization 220 and a reliable media protocol (RMP) module 230 are assisted by the inclusion of NAL header parser 210 according to the principles of the present invention. Moreover, a network monitor 270 interfacing to network interface 250 collects current network statistics and, via retransmit decision maker 275, improves the reliability of RMP module 230. NAL header parser 210, network monitor 270 and retransmit decision maker 275 are highlighted in FIG. 2A to show that FIG. 2A is different from FIG. 1 as will be further explained below.

Figure 6:
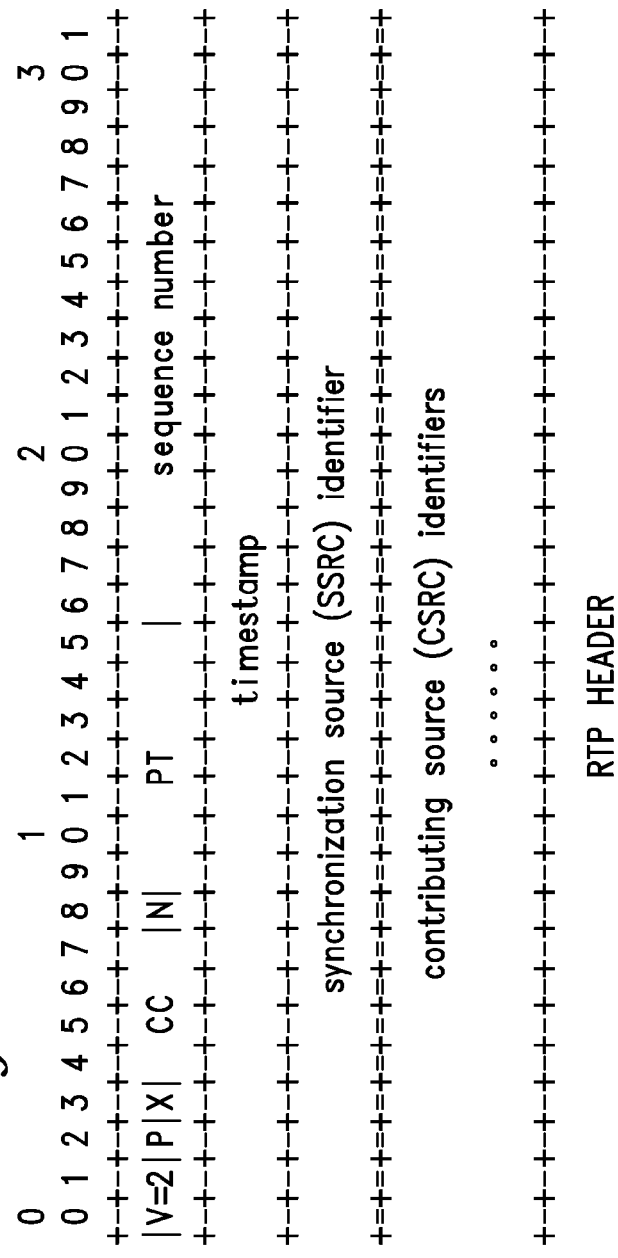
FIG. 6 shows an exemplary format of a real-time protocol (RTP) header in which priority data may be transmitted and from which network statistics may be calculated in accordance with aspects of the present invention,.
Figures 7, 8:
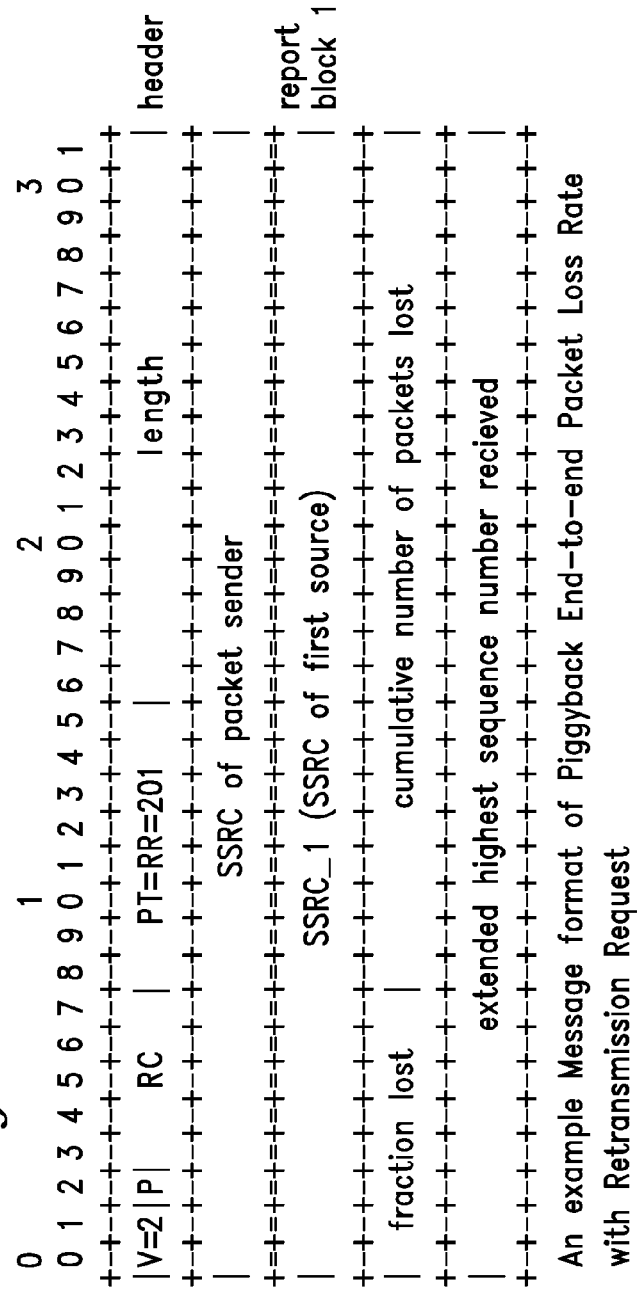
FIG. 7 shows an exemplary format of an MPEG transport stream (TS) header, for example, MPEG-2, including a continuity counter (CC) field from which network monitoring statistics may be derived according to aspects of the present invention.
FIG. 8 shows an exemplary format of a message including a transmission request and end-to-end packet loss rate from which network monitoring statistics may be derived according to aspects of the present invention.

Initially, RMP module 230 transmits the regular unicast and multicast data or packets using UDP 240 via network interface 250 to transmit packets using initial transmit channel 260 to network 110. Data is initially stored in local cache 235 with a priority assigned by NAL header parser 210 via RTP packetization 220. Apart from this, an additional reliable TCP-based control channel 245 is established between the source (transmitter, sender) 200 of FIG. 2A and the destination (receiver, sink, client) 201 of FIG. 2B. TCP/IP 245 requests the retransmission of and receives lost packets through network interface 250 via retransmit ACK/NACK control channel 255 to network 110. For this mechanism to work properly, the transmitter (sender, server) 200 maintains a cache 235 of the most recent packets that were sent to its receivers/clients. One or more receivers/clients 201 receive the data packets from the transmitter/server 200 and may detect sequence gaps in the received data packets using the sequence number field present in the RTP (FIG. 6) or MPEG transport stream (TS) header (FIG. 7). If the receiver 201 detects a sequence gap, the receiver 201 sends a request on the TCP-based control channel 255 for selective retransmission of the missing data packets. When the transmitter/server 200 receives a retransmission request from one or more of its receivers/clients 201, it looks in its local cache 235 of most recent packets. If the requested packet(s) is/are found in the local cache 235, the sender/server 200 retransmits in unicast a copy of the packet to the receiver 201 on the TCP-based control channel 255 via network 110. If the requested packet was not found in its local cache/buffer 235, the sender 200 continues servicing the rest of the retransmission requests. The receiver/client 201 maintains a delivery queue (buffer/cache) 236 to hold all of the received data packets from both data and control channels. The receiver/client 201 also reorders the retransmitted packet into the correct sequence (position) within this queue and delivers the packets to the application in the proper order at the correct time, for example, a video player application 221 for display 206.

The receiver/client 201 (FIG. 2B) maintains a configurable time window to wait for any retransmissions rather than waiting forever so that the packet delay and delay jitter can be kept within the application bounds. Moreover, receiver/client 201 is provided with a network monitor 271 according to one embodiment for collecting network statistics from the perspective of the receiver/client 201 for transmission via control channel 255 to transmitter/server 200. Network monitor 271 is shown highlighted in FIG. 2B to show the cooperation between network monitor 271 and network interface 251 for collecting and providing network statistics according to the present invention to transmitter/server 200 for improved retransmission decision making as will be further described herein.

The receiver/client 201 of FIG. 2B passes the rest of the received packets from the delivery queue to the application, for example, video player 221 and display 206, if some of the retransmission replies for the lost packets are not received in time. If some of the retransmitted packets are received beyond the acceptable recovery time window they are discarded by the receiver. It should be noted that a video application can tolerate some data packet loss using error concealment technology in video decoding.

Referring again to FIG. 2A, the reliable media protocol (RMP) scheme in the present invention operates via RMP module 230, 231 between the real-time application/RTP/MPEG TS and UDP/TCP/IP through the assistance of parser 210 for prioritization and improved retransmit decision making with the assistance of network monitors 270 and 271. At server/transmitter 200, an abstraction-layer header parser, for example, Network Abstraction Layer (NAL) header parser 210 operates on locally provided or network provided digital video data 205. NAL header parser 210 outputs a priority and the data for real-time protocol (RTP) packetization 220. Moreover, a network monitor 270 recovers current network 110 statistics and outputs control data to retransmit decision maker 275 to aid RMP module 230. For example, in furtherance to the example of an enhancement layer assigned a medium priority versus a base layer assigned a high priority, RMP module 230 will retransmit the high priority base layer data and not transmit the medium priority enhancement layer data in the face of an available bandwidth detected by network monitor 270 below a given threshold value. For example, rather than transmit all packets held in cache/buffer memory 235, a retransmission decision maker 275 may select a portion of the packets held in memory 235 for retransmission based on network monitor collected statistics, such as packet loss rate or other network conditions, and a priority assigned by NAL header parser 210. Thus the combination of assigning a priority to data at parser 210 in combination with retransmit decision making according to retransmit decision maker 275 provides for a highly reliable media protocol (RMP) module 230 as will be further described in connection with a discussion of FIG. 4.

Referring again the FIG. 2A, a typical network interface 250 is shown between network 110 and RMP module 230 at server/transmitter 200. Examples of network interface modules are Ethernet cards, IEEE 802.11/WiFi cards that connect to the computer network 110.

FIG. 2B shows the schematic of an exemplary implementation of a client device 201. The client may includes a video player/streaming application module 221, a display 206, a buffer (cache memory) 236, a reliable media protocol (RMP) module 231, a UDP/IP module 241, a TCP/IP module 246 and a network interface 251. The network interface 251 may be, for example, an Ethernet interface or an IEEE 802.11 interface or other known network interface. The network interface 251 receives all incoming messages. The messages arrive on different sockets/addresses. Network monitor 271 collects current network statistics from the perspective of receiver/client 201 from network interface 251 and outputs a suitable control message on channel 255 reporting on collected statistics. The network interface 251 can thus determine where to forward received messages from network 110 and output statistics data from network monitor 271 and messages from TCP/IP module 246. New incoming data packets are forwarded to the UDP/IP interface by the network interface module 251. Requests for retransmission of data packets and the retransmitted data packets are forwarded to the TCP/IP module 246 by the RMP module 231. The RMP module 231 determines if any of the received data packets have been corrupted and makes use of both UDP/IP and TCP/IP to orchestrate the packet recovery. The RMP module 231 generates a retransmission request for any corrupted data packets. The RMP module 231 then forwards the retransmission request to the TCP/IP module 246 for transmission over the network 110. At the network interface 251, any network statistics data collected by network monitor 271 are incorporated into the retransmission request for transmission over network 110. The RMP module 231 also stores the received packets in the local buffer 236 for reordering. Once the retransmitted packets are received from the TCP control channel via the TCP/IP module 246, the RMP module 231 arranges the packets in the correct order. The RMP 231 maintains a queue that is sorted on the sequence number and will reorder and insert packets into this buffer area/queue. When the recovery window expires, the RMP module 231 delivers the packets, for example, to the player/streaming application 221 for display 206. The RMP module 231 provides a socket-like application protocol interface (API) 216 for data passing and integration with the application. Note that some packets may not be recovered by the timeout of recovery window.

Data packets arriving after the expiration of the recovery window are discarded per FIG. 4. Depending on the application, for example, for video, the streaming/player application 221 depacketizes and/or decodes the data and passes the data to the display/speaker 206. The incoming packets are stored in the RMP "Buffer area" and will be handed over, for example, to the application for rendering (display) 206 whenever an application requests a packet. The box labeled "Config" 226 is a "Configuration Interface" to the RMP module 231. RMP module can be configured at the time of initialization to set parameters such as cache size, maximum time to wait for packet recovery etc.

At a receiver/client 201 according to FIG. 2B, a network monitor 271 may collect current network statistics at network monitor 271 from the perspective of receiver/client 201 via interface 251 and output the network experience of client/receiver 201 via control channel 255 to a server with which it is connected via digital data network 110. Upon receipt at transmitter/server 200 via network 110, such collected network statistics are output via interface 250 to network monitor 270 to supplement statistics gathered by network monitor 270 from the perspective of the transmitter/server of network 110 as discussed above. Digital data network 110 may be any digital data network including but not limited to satellite networks, land-based wireless networks, fiber optic networks, coaxial cable networks, twisted pair networks, local area networks, wide area networks and other known digital data networks. A typical network interface 251 is shown between network 110 and RMP module 231 at client/receiver 201. Examples of network interface modules include Ethernet cards, IEEE 802.11/WiFi cards and the like that connect to the computer network 110.

Before discussing FIG. 3, it is of import to note that similar reference numerals denote similar elements in the drawings. Moreover, the first number of a reference number such the first number 1 of reference number 110 for network 110 indicates the figure number where the element first appears. Consequently, for example, RMP module 230 first appears in FIG. 2, is similar to reliable media protocol (RMP) module 130 of FIG. 1, but is a different module from reliable media protocol (RMP) module 130 of FIG. 1, because of the introduction of NAL Header Parser 210 and Network Monitor 270 and Retransmit Decision Maker 275, all of which are not found in FIG. 1. Also, network monitor 271 of client/receiver 201 of FIG. 2B, in accordance with the principles of the present invention, improves the operation of RMP module 230 and Retransmit Decision Maker 275 of FIG. 2A. Some of the advantages of parser 210, network monitors 270 and 271 and retransmit decision maker 275 have been described above but will be further described in connection with the discussion of FIGS. 3 and 4 below.

Figure 3B:
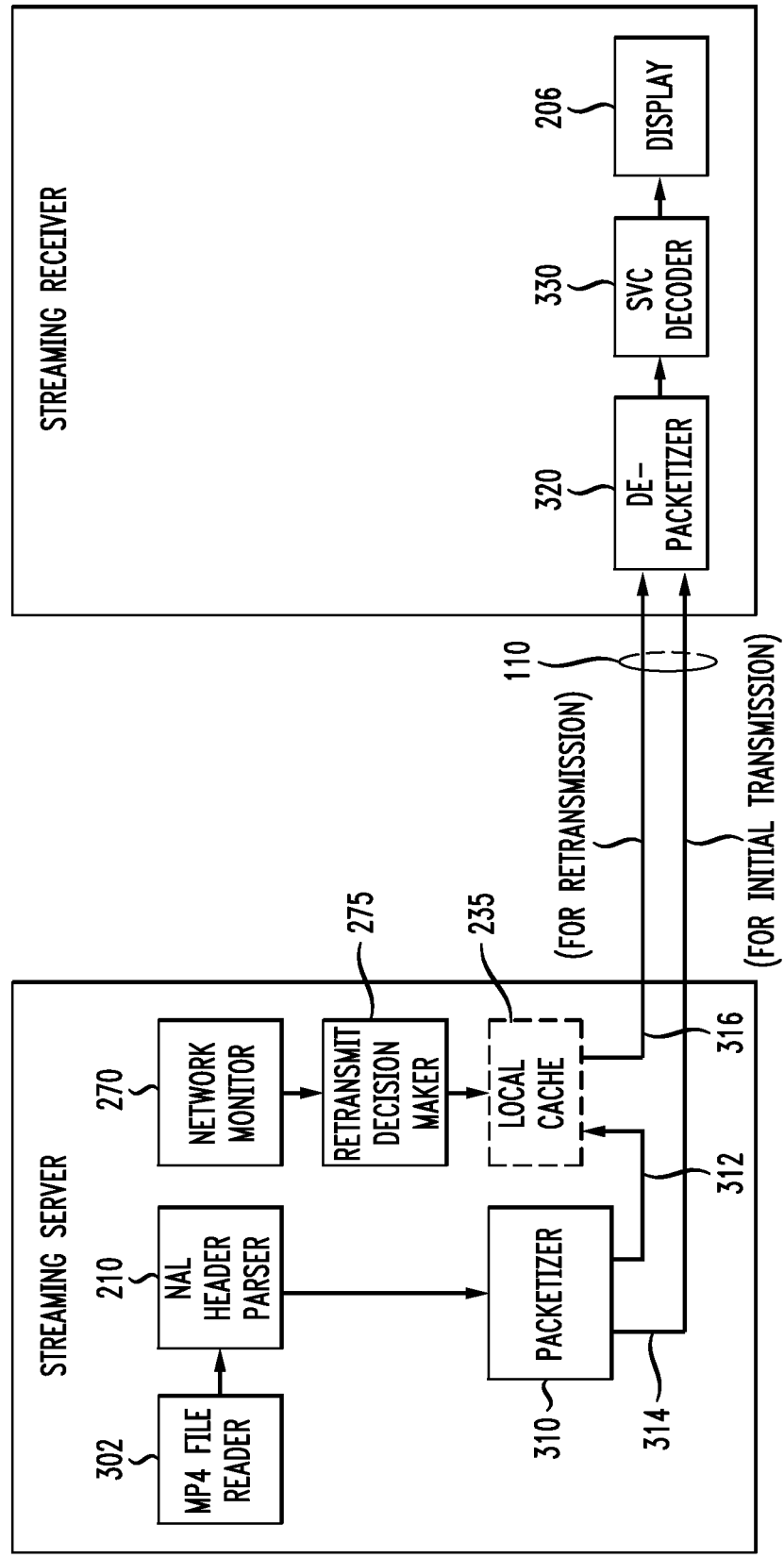
Figure 3C:
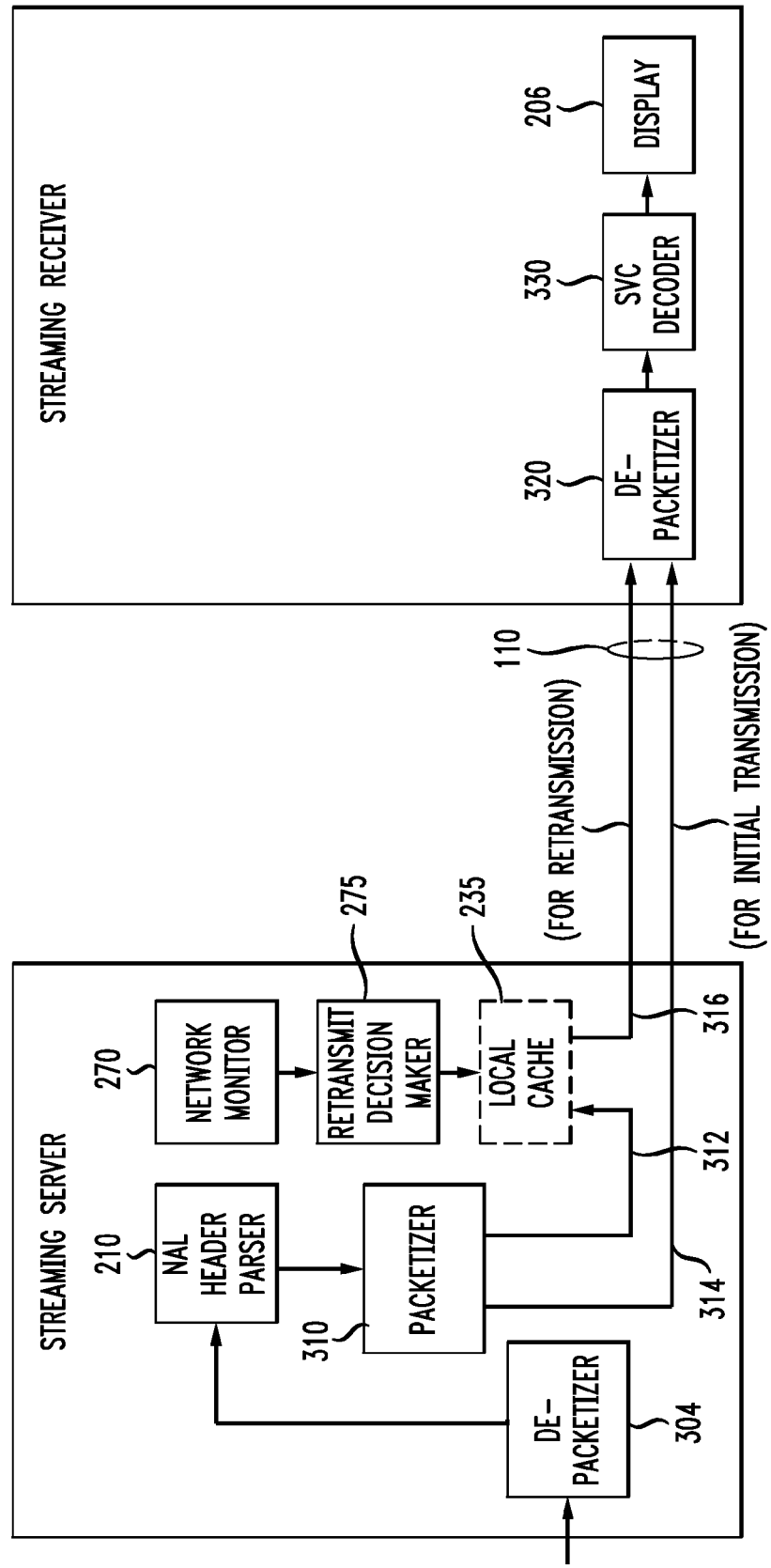

FIG. 3 provides a direct representation of NAL abstraction-layer header parser 210, network monitor 270 and retransmit decision maker 275 of a streaming server/transmitter with reference to transmission to one or more streaming receivers connected via network 110. Referring to FIG. 3A, there is shown a scalable video coder (SVC) encoder 300 which may be located at the streaming server or remotely from it. A scalable video coder (SVC) provides temporal or frame rate scalability, spatial or picture size scalability (video is, for example, coded at multiple resolutions and aspect ratios) and signal-to-noise ratio (SNR) or quality/fidelity scalability as will be described further herein. NAL header parser 210 may be an H.264 compliant AVC Network Abstraction Layer (NAL) header parser or other abstraction-layer header parser with similar functionality as will be further described in connection with FIG. 4. For example, with reference to FIG. 3B, NAL header parser 210 may receive an input from local memory store, for example, an MP-4 file reader 302. An exemplary streaming server embodiment may be a streaming server for providing IP television channel or movie services. In alternative embodiment FIG. 3C, there is shown a de-packetizer 304 for receiving, for example, streaming video from the network 110 and outputting the received packets to NAL header parser 210. An exemplary video application of the streaming server of FIG. 3C may be video telephony where the depicted streaming server is one server in a network path from one video communications terminal to another.

In each of FIGS. 3A, 3B and 3C, the NAL header parser 210 may provide a packet/frame priority via packetizer 310 to local cache 235. For initial transmission, parser 210 outputs parser data and priority to packetizer 310. Per path 312, a copy is placed in local cache 235 and per path 314, the packetizer sends packet data to depacketizer 320 of streaming receiver. Network monitor 270 provides network transport condition data to retransmission decision maker 275 for selectively deciding on whether or not to retransmit a packet/frame stored in local cache 235 for retransmission over path 316 via network 110 to de-packetizer 320. Path 316 is used for retransmission of selected packets according to transport conditions and parser assigned priority.

Now, with reference to FIG. 4, the functional operation of an abstraction-layer header parser, network monitor and retransmission decision maker according to the present invention will be further described with reference to the depicted flowchart showing both sender or transmitter/server side operation and receiver/client/terminal side operation. At block 400, the server/transmitter of FIG. 3 obtains data, for example, from a local file, per FIG. 3B, file reader 302, or receives data from a network interface, for example, from network 110 and de-packetizer 304 of FIG. 3C. The received data is provided to block 410 which represents the abstraction-layer header parser 210 of FIGS. 2A and 3.

Figure 5:
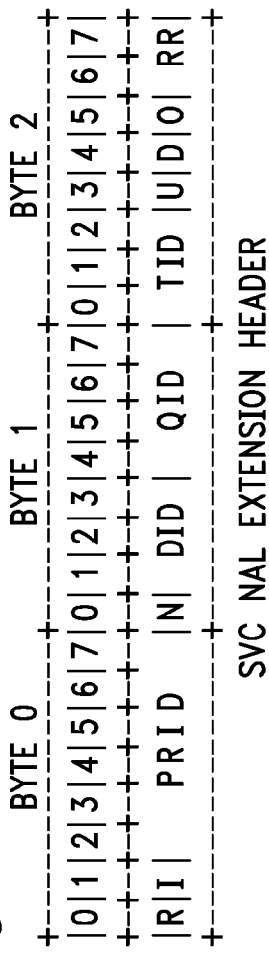
FIG. 5 shows an exemplary data contents representation format of a scalable video coder (SVC) Network Abstraction Layer (NAL) extension header for parsing in accordance with the principles of the present invention,.

Referring briefly to FIG. 5, there is shown a typical abstraction-layer header, for example, an SVC NAL extension header, providing fields to be parsed. For example, the abstraction-layer header parser 410 may parse a DID field shown appearing at positions 1-3 of the second byte (BYTE 1) which represents an inter-layer coding dependency of layer representation or level of spatial/resolution scalability. A QID field at, for example, positions 4-7 of the second byte (BYTE 1), may follow and represents a quality level of medium grain scalability (MGS) layer representation. A TID field, for example, at positions 0-2 of the third byte (BYTE 2), represents a temporal level of layer representation. One result of parsing an abstraction-layer header comprising such fields is to identify the layer that the following payload data is associated with. Responsive to the identification of the payload data type, a parser at parser block 410 of FIG. 4 may assign a different priority for each identified layer for following data: for example, a low, medium and high priority. More than three levels of priority may be employed in alternative embodiments. For example, a base layer may receive a high priority for retransmission from buffer or cache memory since base layer is absolutely necessary for a complete decoding at a receiver. An enhancement layer may be assigned a medium priority since enhancement layer data is necessary for decoding of a higher layer. An SVC-encoded stream of digital data may comprise a base layer and one enhancement layer. On the other hand, a second or more enhancement layers may be provided for even greater picture quality enjoyment and, so, a higher enhancement layer may be assigned a low priority in cache 235 for associated payload data.

To provide a simplified example, if SVC-encoded video data has a base layer of a resolution of 416 by 240 and a bit rate of 600 kbps and one enhancement layer of a higher resolution of 832 by 480 and a consequent bit rate of 1.2 megabits per second for video streaming, then, the parser 410 can identify the base layer NAL units based on its DID field and assign the base layer a higher priority. On the other hand, the enhancement layer may be assigned a lower priority (to provide the higher resolution). The base layer is assigned the higher priority than the enhancement layer in this example. The output priority level may be indicated in a payload type (PT) field of an RTP header shown in FIG. 6 at positions 9-15. Once assigned a priority, for example, low, medium and high, the priority information may also be represented in a similar field of a real-time protocol (RTP) header, if retransmission is called for at the transport layer, or in a type of service (TOS) field of an IP header. Initially, a copy is buffered at block 420 in local cache/buffer memory at 430 as the packet is transmitted via "send the packet" 450 toward a receiver via network 110. The packet may be lost in the network or received.

The packet in local cache 430 awaits a determination as to network conditions and whether the packet is received or not.

If the packet is received and network conditions appear to be good, the packet is received 460 and the receiver determines at 465 whether an expected packet is lost (Yes) or not (No). If lost (Yes), then at 485, a retransmit request is sent, and a recovery timer of a receiver is set via the control channel 255 of FIG. 2B back to the sender/transmitter/server 200. If no, then at 490, the received packet is placed in proper order in a receiving buffer, for example, for a display function 206 at the receiver/client 201.

If a retransmit request is sent via 485, a network monitor function 405 is actuated and the received retransmit request is then processed. As will be described further herein, an end-to-end packet loss rate at a given time may be determined at a network monitor 271 as a current network 110 condition from the receiver side. The current network condition, for example, an end-to-end packet loss rate, is provided with the retransmit request as an output of 405 to retransmission decision maker 415.

An exemplary application of a network monitor 405 may be where the sender/server is on a wired network 110, for example, a set-top box (cable or satellite) or home gateway and the receiver is a mobile device or personal computer that is associated with a wireless access point AP. An intermediate node/wireless access point (AP/router) may report the network and wireless channel conditions to the sender. A real-time packet retransmission decision made by a reliable media protocol (RMP) module 230 according to the principles of the present invention may be thus layer-aware when modified to incorporate an abstraction-layer header parser and method according to one embodiment.

Retransmission decision maker 415 questions whether, for example, the current end-to-end transmit packet loss rate is high, meaning whether it is above a threshold level set in memory of the RMP module 230. If the answer is YES, then, at 445, lower priority packets are dropped, and only higher priority packets are recovered from cache/buffer 430 and retransmitted. Other measures of transport conditions besides packet loss rate may be available bandwidth (for example, the lowest available bandwidth in an end-to-end path) and round-trip delay (a longer round-trip delay may require the time-out of a packet held in cache/buffer 235 for retransmission). Each of these, including available bandwidth, may be compared with an associated threshold level set in memory for deciding on packet retransmission. One or more may be employed in making the retransmission decision as well as packet priority set by parsing 410. If the answer is returned NO, at 435, all requested packets are retransmitted from cache/buffer 430 via "send the packet" 450 and network 110.

Upon receipt, the retransmitted packet is received at 460 and recognized as a retransmitted packet at 470. Given a real-time viewing experience, the time of receipt is examined at 475. The question is asked: Retransmit late? If the retransmitted packet is received too late, that is, the program viewing experience has already moved on to a next frame, then, the retransmit packet is discarded at 480. On the other hand, if the retransmit packet is not late, (i.e., the answer is NO), the retransmit packet is placed in order in a receiving buffer for display at 490.

The RMP method of the present invention may be implemented in a flexible software library, hardware, firmware, any computer or processor, an application specific integrated circuit (ASIC), a reduced instruction set computer (RISC), a field programmable gate array (FPGA) or an combination thereof. The RMP method of the present invention uses socket-like user-space APIs and underlying transport means for easy integration with streaming server and player applications. The RMP method of the present invention is transparent to the streaming applications that it supports. The UDP data channel and the TCP control channel are internally maintained. The RMP method of the present invention is extensible to support other error recovery schemes such as FEC and hybrid ARQ.

The network monitor function 405 of the present invention will now be described further with reference to FIGS. 6, 7 and 8. One possible approach is shown in FIG. 6 where the network monitor 271, for example, may detect a sequence gap from a sequence number, positions 6-1 of first line. Another approach is to utilize a continuity counter (CC) field of an MPEG-2 transport stream header of one byte as seen in FIG. 7.

The exemplary format of the message for sending statistics collected by a network monitor 271 of a receiver/client 201 of FIG. 2B to server/transmitter 200 of FIG. 2A is shown in FIG. 8. The message format may be similar to an RTP Control Protocol (RTCP) receiver report (RR) message. In particular, one may provide a "fraction lost" field, for example, at positions 0-7 of line 4. Other relevant data may be provided such as a cumulative number of packets lost which may be compared with a previously received cumulative number of packets lost received on the same channel. The difference provides a number of packets lost within an interval defined by the time between successful receipt of successive messages.

FIG. 9 provides a format for a sender/server/transmitter obtaining network packet loss through the retransmission requests received from the receiver/client 201. A network monitor function 405 of FIG. 4 calculates a number of lost packets from the fields "Base sequence # of starting packet" and "offset for ending packet." Similarly, the RMP ARQ request (NACK) packet of FIG. 10 provides a base sequence number which can be stored and compared with subsequently received base sequence numbers. The depicted base sequence number and the bitmap indicate the sequence of the packets that the receiver requests to be retransmitted. Yet another approach to determining network transport conditions is to monitor the lower layer, for example, network/MAC/PHY level transmission statistics to estimate the channel conditions and available bandwidth.

In the RMP scheme of the present invention described above, no alterations are made to the packets sent on the data channel 255. Thus, backward compatibility is maintained. Also the RMP scheme of the present invention makes efficient use of the bandwidth since only the lost media packets are requested and retransmitted on the control channel with low overhead. The lost packet requests serve as NACKs (Negative Acknowledgements) and also provide feedback to the sender. It can provide high reliability under widely different channel conditions because a lost packet can be retransmitted multiple times within the recovery time window. Also the RMP scheme of the present invention enforces the application's latency constraint by having a maximum wait time (i.e., a recovery window) for retransmissions and thus operates on the best effort delivery model within the given time constraint.

Note that the above embodiment is explained using video transmission. The present invention can also be applied to transmission of audio, for example, telephony, and other real-time multimedia streaming applications.

Though the above scheme of the present invention has been described with respect to wireless networks, the scheme could be used in any kind of network that involves packet losses.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware—such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform, such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method comprising:
    receiving an encoded video data from a source of digital video data, said encoded video data being scalably encoded and carrying a video content, said encoded video data including a network abstraction layer (NAL) extension header, a first layer for said video content, and a second layer for said video content, said first layer including first video data utilized to retrieve said video content in basic quality from said encoded video data, said second layer including second video data utilized along with said first video data to retrieve said video content in enhanced quality from said encoded video data;
    parsing said NAL extension header to identify said first and second video data; assigning a higher priority to said first video data for retransmission relative to said second video data;
    caching said first and second video data with said assigned priority in a buffer memory;
    transmitting initially said encoded video data to a receiver via a first data channel of a digital data network, said digital data network further including a second data channel, said first data channel utilizing a first transport protocol and providing a uni-directional data communication from a transmitter to said receiver, said second data channel utilizing a second transport protocol and providing a bi-directional data communication between said transmitter and said receiver, said first protocol being less reliable than said second protocol;
    monitoring a digital data network to collect first network data on statistics of said digital data network from a perspective of said transmitter, said first network data indicating first network transport conditions, said first network transport conditions including at least one of a first end-to-end packet loss rate, a first available bandwidth of said digital data network, and a first round-trip delay;
    receiving a retransmission request transmitted via said second data channel from said receiver, said retransmission request including second network data on statistics of said digital data network from a perspective of said receiver, said second data indicating second network transport conditions of said digital data network determined at said receiver, said second network transport conditions including at least one of a second end-to-end packet loss rate, a second available bandwidth of said digital data network, and a second round-trip delay;
    supplementing said first network data with said second network data; and
    determining whether to recover at least one of said first and second video data from said buffer memory and transmit said recovered video data to said receiver via said second data channel in accordance with said assigned priority in view of said supplemented first network data in response to said retransmission request.

2. The method of claim 1, wherein said source of digital video data includes one of an MP4 file reader and a de-packetizer.

3. The method of claim 1, wherein said first transport protocol includes the User Datagram Protocol (UDP) and said second transport protocol includes the Transmission Control Protocol (TCP).

4. The method of claim 1, wherein said digital data network includes at least one of a satellite network, a land-based wireless network, a fiber optic network, coaxial cable network.

5. The method of claim 3, wherein said digital data network includes at least one of a satellite network, a land-based wireless network, a fiber optic network, coaxial cable network.

6. The method of claim 1, wherein said network abstraction layer (NAL) extension header includes an NAL extension header of an H.264/AVC Network Abstraction Layer.

* * * * *